United States Patent [19]

Reed

[11] Patent Number: 5,050,442
[45] Date of Patent: Sep. 24, 1991

[54] WINDSHIELD WIPER WITH EXCESS LOAD RELIEF

[75] Inventor: Glenn R. Reed, Dayton, Ohio

[73] Assignee: General Motors Corporation, Detroit, Mich.

[21] Appl. No.: 528,313

[22] Filed: May 24, 1990

[51] Int. Cl.$^5$ .............................................. B60S 1/02
[52] U.S. Cl. ............................................ 74/42; 74/599; 15/250.31; 15/250.30; 15/250.27; 403/2; 403/61
[58] Field of Search .......... 15/250.16, 250.17, 250.13, 15/250.18, 250.27, 250.31, 250.30; 403/53, 57, 2, 61; 464/30, 37, 38, 69, 112, 120; 74/599, 584, 42

[56] References Cited

U.S. PATENT DOCUMENTS

| | | | |
|---|---|---|---|
| 664,578 | 12/1900 | Pancoast | 74/599 |
| 1,617,666 | 2/1927 | Cattaneo | 74/599 |
| 1,761,526 | 6/1930 | Geyer | 74/599 |
| 2,259,790 | 10/1941 | Auten | 15/250.30 |
| 2,811,867 | 11/1957 | Hogberg | 464/112 |
| 2,857,758 | 6/1958 | Adams et al. | 15/230.13 |
| 2,941,826 | 6/1960 | Flajole Jr. et al. | 287/53 |
| 3,012,266 | 12/1961 | Riester et al. | 15/250.30 |
| 3,532,371 | 10/1970 | Ortheil | 403/53 |
| 3,602,065 | 8/1971 | Ratcliff | 403/2 |
| 3,688,333 | 9/1972 | Cimino et al. | 15/250.16 |
| 3,716,887 | 2/1973 | Bellware | 15/250.17 |
| 3,745,853 | 7/1973 | Deibel et al. | 15/250.13 |
| 3,763,518 | 10/1973 | Bellware | 15/250.17 |
| 4,264,997 | 5/1981 | Kolb et al. | 15/250.3 |
| 4,736,487 | 4/1988 | Epple et al. | 15/250.31 |
| 4,765,018 | 8/1988 | Buchanan, Jr. | 15/250.3 |

FOREIGN PATENT DOCUMENTS 2029542 3/1980 United Kingdom ............. 15/250.31

Primary Examiner—Harvey C. Hornsby
Assistant Examiner—Gary K. Graham
Attorney, Agent, or Firm—Patrick M. Griffin

[57] ABSTRACT

A windshield wiper drive link is pivoted indirectly to a crank arm through an intermediate toggle member and a pair of oppositely directed beams cut into the side walls of the drive link stamping. Under excess load, one or the other of the beams will buckle in compression, allowing the drive link to in effect change length, thereby yielding to avoid overload.

2 Claims, 2 Drawing Sheets

WINDSHIELD WIPER WITH EXCESS LOAD RELIEF

This invention relates to vehicle windshield wipers in general, and specifically to a wiper with an improved means for relieving excess loading in the linkage.

BACKGROUND OF THE INVENTION

Vehicle windshield wiper systems typically include a drive motor that continuously rotates a crank arm. In order to translate the continuous rotation of the crank arm into the back and forth sweeping action needed in a wiper, a linkage connects the crank arm to the wiper. The linkage, usually a four bar linkage, has a main drive link that drives another arm connected to the wiper post. The wiper is oscillated back and forth between inner and outer wipe limits determined by the lengths of the various arms and links of the linkage, often with a large mechanical advantage. If obstructions such as ice and snow block the wiper from reaching the design limits, the linkage can see high tension or compression loads, high enough to strain the system. Some systems therefore incorporate a snow clutch located somewhere in the linkage, often between the crank arm and main drive link. Known snow clutches incorporate a member, such as a coil spring or block of elastomer, that can slip or give at high loads. Others use a pair of toothed disks loaded together by spring washers that can slip past one another at high loads. Besides the obvious cost and space disadvantages involved in providing the extra components needed, an inherent problem exists with any snow clutch that uses a yielding member like a spring. A spring yields in a continuous, linear fashion, proportional to the load. Yielding at lower, normal operating loads would change the link lengths and wipe pattern when it was not desired to to so. Therefore, the springs used in such designs are typically very large and heavy, so as to yield only at very high, excessive loads.

SUMMARY OF THE INVENTION

The invention provides a new design for a snow clutch that yields only beyond a threshold of excess tension or compression load, and which does not yield until then, so that the normal wipe pattern is not jeopardized at normal loads.

In the preferred embodiment disclosed, a conventional drive motor rotates a crank arm and a conventional linkage sweeps a wiper through its wipe pattern. The linkage has a main drive link, which is an elongated metal stamping of U shaped cross section with a base wall and parallel side walls. The drive link is subject to tension or compression loads along its axis as it operates, loads that may become too high should the wiper encounter an obstruction. The crank arm is joined to the drive link through a snow clutch comprised of a cooperating toggle member and beam member. The toggle member has the general shape of a short rod, with a ball at each end and a central journal pivoted to the end of the crank arm. The beam member includes first and second beams stamped integrally from the side walls of the end of the drive link itself. Each beam is in the form of a flap with a free end and a fixed end. The ball at each end of the toggle member is joined to the free end of a respective beam by a socket joint, so that the toggle member is normally maintained perpendicular to the drive link axis.

As the wiper operates normally, the crank arm rotates, and moves the drive link just as if the end of the drive link were pinned directly to the crank arm. The drive link does not see enough tension or compression to affect the shape of the beams, which stay in the plane of the side walls of the drive link stamping. Should the wiper encounter an obstruction, however, the drive link will see a high compression or tension load along its axis. Compression will also be be felt along the length of one of the beams, enough so to exceed its critical load and buckle it out of the plane of its respective side wall. The socket joints allow the toggle member to cock relative to the axis of the drive link as the one beam buckles. This yielding allows the effective length of the drive link to change, preventing excess stress elsewhere in the system. This yielding by buckling occurs quickly, in quantum like fashion, instead of continuously, as with a coil spring. Therefore, the link operates with a fixed length right up until the point where it needs to change. When the excess load is removed, the beam straightens again. Since the beams are integrally stamped, the only extra component necessary is the toggle member, which is inexpensive and compact.

It is, therefore, an object of the invention to provide a vehicle wiper snow clutch that yields discontinuously.

It is another object of the invention to provide discontinuous yielding through the use of a beam member connecting the crank arm and drive link that has a pair of oppositely directed beams, one of which is designed to buckle when the drive link sees either excessive compression or tension, respectively.

It is another object of the invention to provide a beam member in which the beams are formed integrally with the side walls of a stamped drive link.

BRIEF DESCRIPTION OF THE DRAWING

These and other objects and features of the invention will appear from the following written description, and from the drawings, in which.

DESCRIPTION OF THE PREFERRED EMBODIMENT

Figure 1:
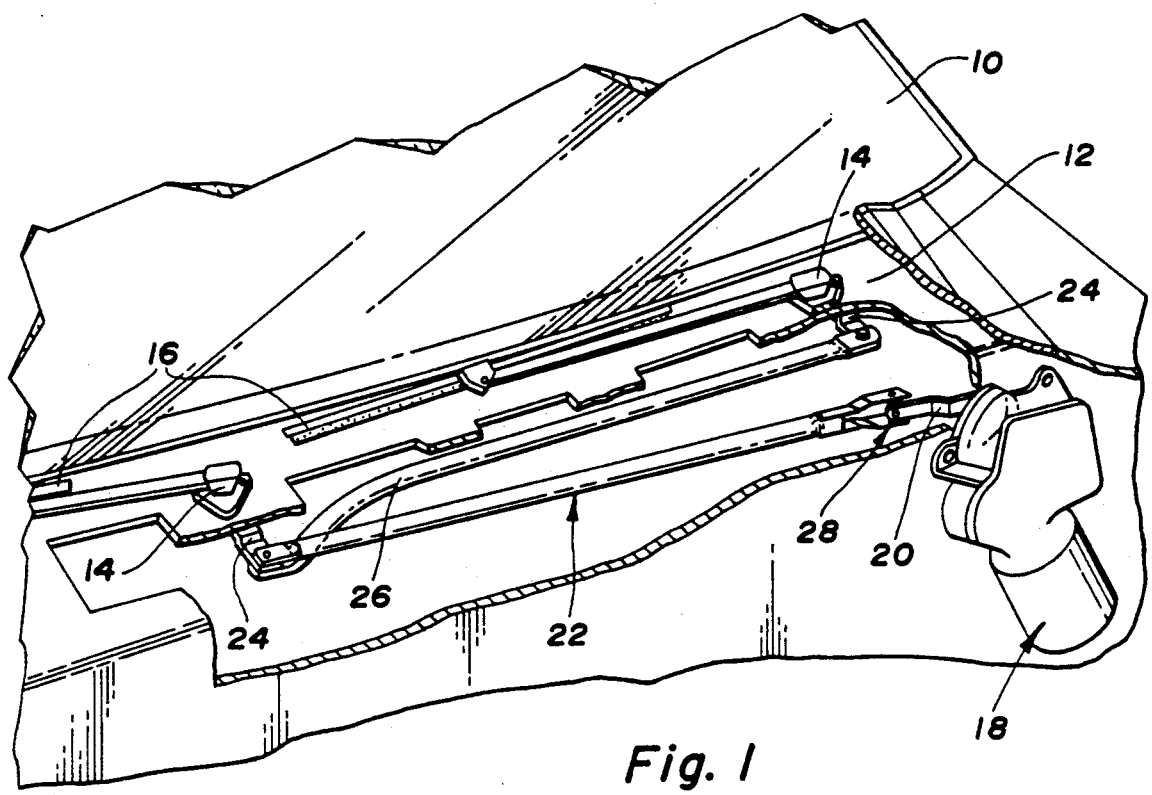
FIG. 1 is a perspective view of the front of a vehicle showing a wiper system incorporating the invention.

Referring first to FIG. 1, a vehicle includes a conventional windshield 10 and adjacent vehicle body structure 12. A pair of wiper posts 14 are rotatably mounted to body 12, to which are mounted a pair of conventional wipers 16. Each wiper 16 is swept back and forth over the surface of windshield 10 in a wipe pattern extending from an inner limit, which is shown, to an outer limit. A conventional wiper motor 18 is the prime mover for the wiper system, and it powers a crank arm 20 fixed to its central shaft, not illustrated. Motor 18 provides only continuous, one direction rotation. Therefore, a linkage must be used to translate the one direction rotation of motor 18 into the back and forth sweep of wipers 16. This is accomplished through a basic four bar linkage.

For the passenger side wiper 16, the four links include ground, crank arm 20, a main drive link indicated generally at 22, and a short link 24 fixed to wiper post 14. For the driver side wiper 16, the basic linkage is the same, but using an elongated slave link 26 run by the main drive link 22. During normal operation, the main drive link 22 will encounter either a compression or tension load along its axis, depending on the direction of the wipers 16. The load will change direction as the wipers 16 do. Such a linkage inevitably develops a large mechanical advantage as it drives the wipers 16. Consequently, if either wiper 16 encounters an obstruction near the limits of the wipe pattern, such as ice or snow, an excessive compressive or tension load may develop along the axis of drive link 22.

Figure 2:
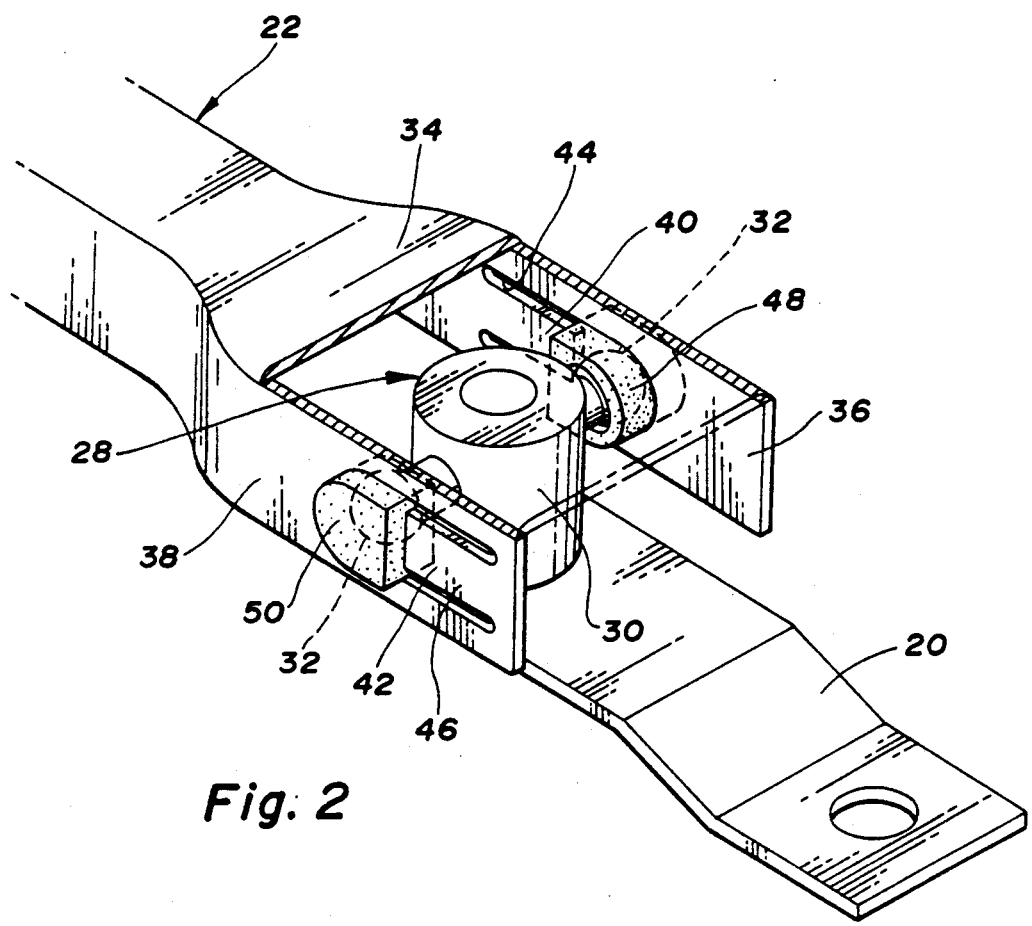
FIG. 2 is a perspective view of the crank arm removed from the motor, and showing part of the drive link stamping cut away to better reveal the toggle member.

Referring next to FIG. 2, the invention provides a novel means or mechanism to couple crank arm 20 and drive link 22, one which will operate conventionally under normal loading, but yield in unique fashion under excess loading. The first element of the mechanism is a toggle member, indicated generally at 28. Toggle member 28 has a cylindrical central journal 30 with a pair of coaxial, spherical ended trunnions 32 perpendicular to the axis of journal 30. Journal 30 is pinned to the end of crank arm 20 with its axis perpendicular to the plane of crank arm 20. Journal 30 could thus rotate freely if trunnions 32 were unconfined. In the embodiment disclosed, drive link 22 is a steel stamping that is generally U shaped, with a widened end having a base wall 34 (broken away in FIG. 2) and parallel side walls 36 and 38. A beam member is comprised of first and second, oppositely extending beams 40 and 42. Each beam 40 and 42 is stamped directly from a respective drive link side wall 36 and 38 in the form of a flap, and therefore is parallel to the other beam and to the axis of drive link 22. Each has the general shape of the end of a tongue depressor, with a fixed end integral with the sheet metal, and a free end aligned with that of the opposite beam. Each beam 40 and 42 is also cut so as to leave a slightly larger slot 44 and 46 surrounding it. Although relatively short, each beam 40 and 42 is significantly longer than it is wide, and is only as thick as the metal from which it is stamped. The spherical end of each trunnion 32 is attached by a socket joint to a respective plastic slider block 48 and 50. While each block 48 and 50 is identical, each is slidably contained in a different slot 44 and 46 respectively, captured between the end of beam 40 and 42 and the closed end of slot 44 and 46, respectively.

Referring next to FIGS. 1 and 2, the normal operation of the invention is illustrated. As the wipers 16 operate, the drive link 22 will see a certain level of compression or tension along its axis. If the beams 40 and 42 remain in the plane of the side walls 36 and 38, drive link 22 will operate conventionally, like a solid member. While the beams 40 and 42 could potentially bend out of the plane of their respective drive link side walls 36 and 38 in cantilever fashion, if unconfined, they are confined, since the blocks 48 and 50 can only slide parallel to the axis of drive link 22 within the tracks provided slots 44 and 46. As a consequence, the beams 40 and 42 cannot move appreciably, except through the mechanism of buckling. Thus, while they are referred to as beams for descriptive purpose, the elements 40 and 42 would behave like columns, as described more fully below. Those skilled in the art will recognize that even a relatively thin beam, if it is not excessively long, will buckle only above a relatively high critical load. Under normal conditions, when the wipers 16 are unobstructed, the load in the beams 40 and 42 will not exceed their critical load, and they will not buckle. Consequently, the toggle member 28 cannot pivot relative to crank arm 20, and crank arm 20 will operate drive link 22 just as if they were pivoted directly together.

Figure 3:
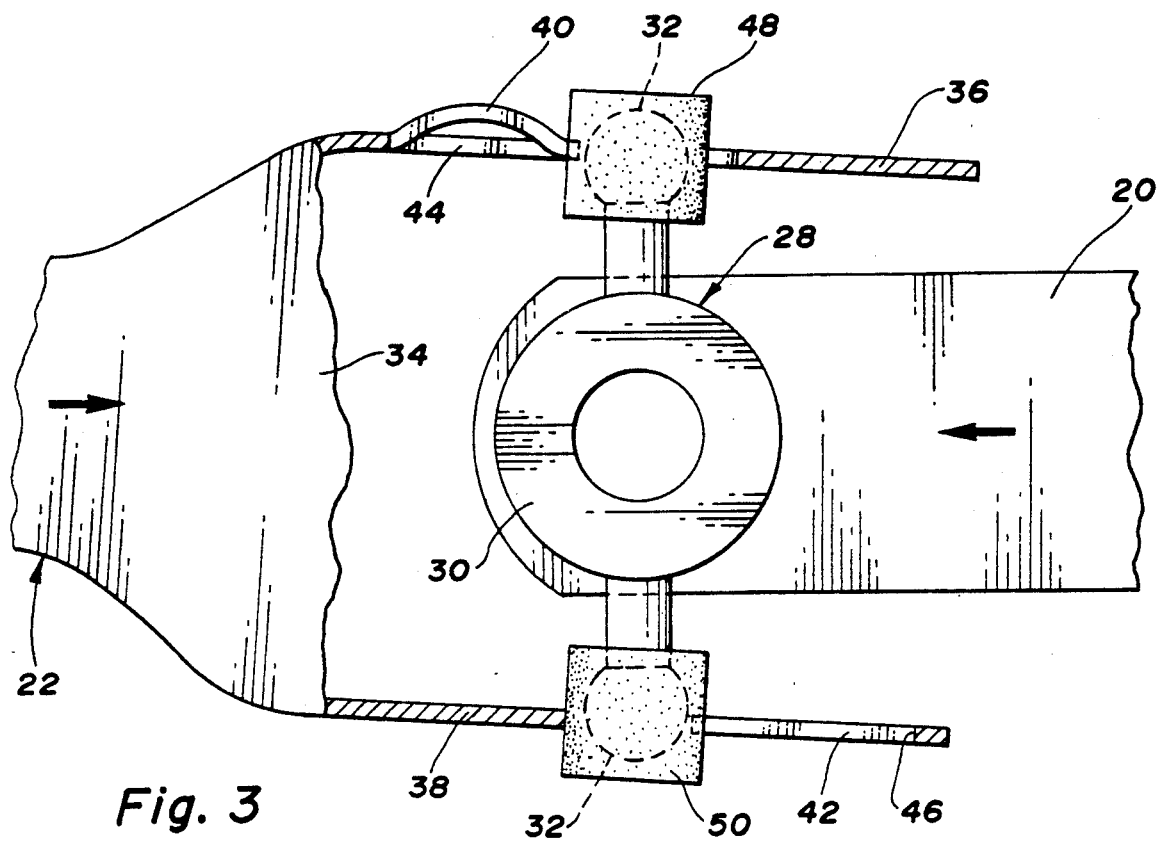
FIG. 3 is a plan view of the structure of FIG. 3, showing one beam buckled when the drive link is experiencing excess compression.

Referring next to FIG. 3, the operation of the invention under other conditions is illustrated. Should either wiper 16 hit an obstruction, the drive link 22 will see either an excess compression or tension load along its axis. Compression is the condition shown in FIG. 3, as indicated by the arrows. The compression force in drive link 22 cannot act on crank arm 2 directly, but only through the intermediate toggle member 28. The toggle member trunnions 32 are also not acted upon directly by the drive link 22, but rather through the slider blocks 48 and 50. As the compression force in drive link 22 pushes it to the left from the perspective of FIG. 3, beam 40 is put into compression as it is forced into slider block 48. Beam 40 pushing into slider block 48 would tend to rotate the toggle member 28 clockwise about its journal 30, but it cannot since the slider block 50 at the end of the opposite trunnion 32 is stopped from moving to the left by the opposite side wall 38, which comprises the closed end of slot 46. The other beam 42 would be put in tension only to the extent that it was rigidly held in slider block 50, but that tension is not likely to be significant, since the ends of the beams 40 and 42 need not be held in their slider blocks 48 and 50 tightly enough to prevent pull out. An equilibrium condition would persist, with toggle member 28 remaining perpendicular to the axis of drive link 22, until the compression in beam 40 exceeded its critical buckling load. When beam 40 does buckle out of the plane of its side wall 36, as shown, it shortens, and the toggle member 28 cocks slightly counterclockwise about journal 30 as slider block 48 slides to the left in slot 44. The spherical ended trunnions 32 simultaneously rotate slightly in the sockets of the slider blocks 48 and 50 to allow toggle member 28 to tilt. As the buckling beam 40 shortens, the center of journal 30 moves inwardly, to the left, the net effect of which is to shorten the drive link 22. The yielding of drive link 22 avoids over stressing some other part of the linkage.

Figure 4:
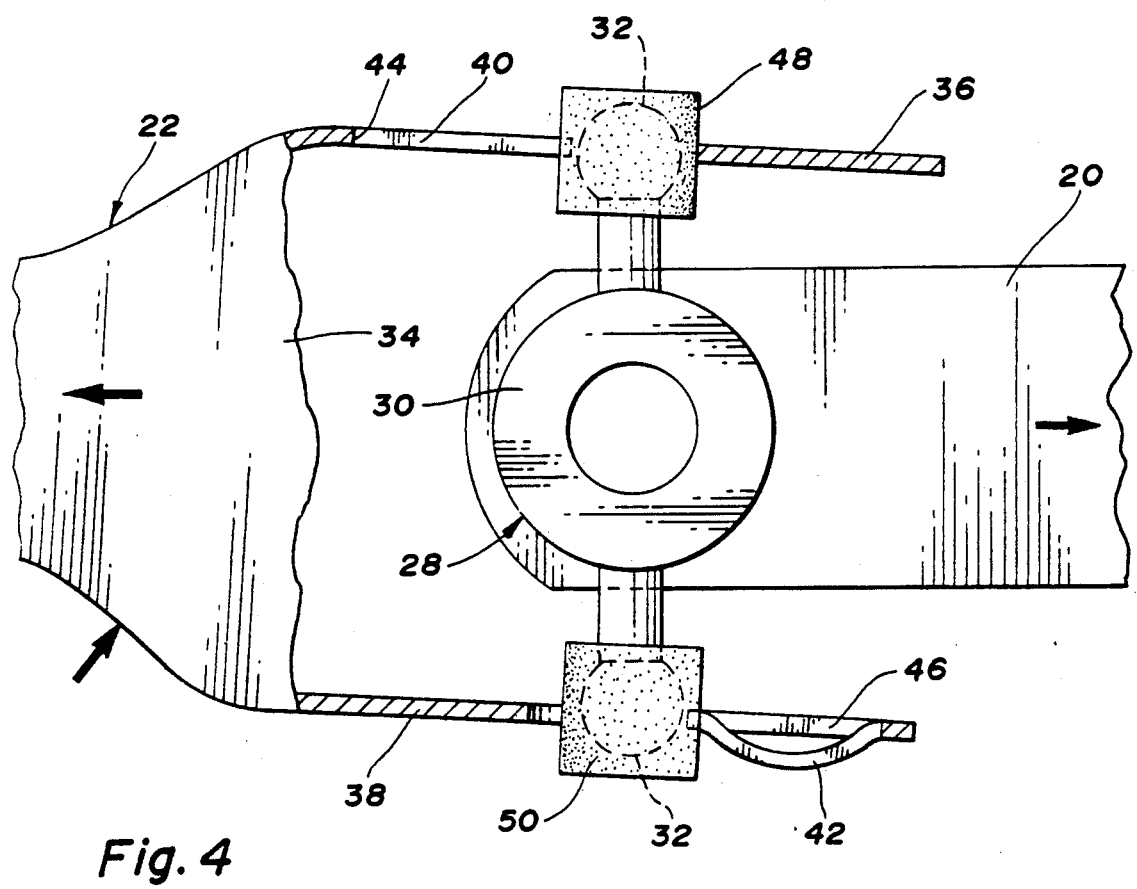
FIG. 4 is a view like FIG. 3, but showing the other beam buckled when the drive link is experiencing excess tension.

Referring next to FIG. 4, the situation is shown where an obstruction puts drive link 22 in tension, also indicated by arrows. Beam 42 is compressed instead, as is the opposite side wall 36. Eventually, beam 42 buckles outwardly as toggle member 28 pivots counterclockwise slightly, as above. Slider block 50 slides to the right in slot 46, but block 50 is stopped by the end of slot 44. The net effect is to move the center of journal 30 outwardly, to the right, lengthening drive link 22. In either case, beam 40 or 42 buckles quite quickly, staying straight until the point where the critical load is exceeded. Until buckling, no yielding occurs, and the linkage operates absolutely conventionally. This discontinuous, step function response may be contrasted to the kind of linear, continuous yielding that would occur with a coil spring. When the excess load is removed, either buckled beam 40 or 42 returns quickly to is original shape.

Those skilled in the art of the mechanics of elastic solids will recognize that the mechanism of buckling would be that of a fixed-hinged column, with the fixed end being the integral end and the hinged end the captured slider block 48 or 50. It would be possible to analytically develop the formulae for the critical load of the beams 40 and 42, as related to the loads seen in the system. As a practical matter, however, it would be far easier for a designer to simply experiment with different lengths and widths of the beams 40 and 42, or even with different gauge metal for the side walls 36 and 38, in order to achieve buckling when desired. Thus, no attempt is made here to quantify the exact size of beams 40 and 42, which would differ for every system. Though the design is simple, with toggle member 28 and the slider blocks 48 and 50 being the only extra components, a high degree of cooperation between the parts exists. A high degree of cooperation between parts is provided. The side walls 36 and 38 conveniently provide beams 40 and 42 in the desired location and orientation. The slots 44 and 46 left over from lancing out the beams 40 and 42 conveniently provide tracks to guide the slider blocks 48 and 50 in the desired direction, that is, in the direction that will buckle the beams 40 and 42, as well as providing stops to prevent them from sliding in the opposite direction. The blocks 48 and 50, in turn, help control and guide the buckling process, and also provide convenient socket joints to compensate for the cocking of the toggle member 28.

Variations in the disclosed embodiment could be made. The invention could be used between any two members in a linkage that are normally just pinned directly together, as the terms crank arm and drive link are intended broadly. With a drive link that was not a U shaped steel stamping, as drive link 22 is, it would not be possible to conveniently make beams like 40 and 42 integral with the end of the drive link. It would be possible, however, to make a separate beam member containing oppositely directed beams similar to 40 and 42 and interpose it between the toggle member 28 and the end of the drive link. If the drive link were a stamping that had a base wall like 34, but did not have suitable side walls like 36 and 38, an alternative would be to stamp the two beams into the top wall. Such beams would extend in opposite directions, but would be collinear to the axis of the drive link and to each other, rather that parallel each other and offset to opposite sides of the drive link axis, as in the disclosed embodiment. In such a case, the toggle member would normally be collinear to the drive link also, rather than perpendicular to it, as in the embodiment disclosed, and would not cock relative to the drive link as the beams buckled. Since such a toggle member would not cock relative to the drive link axis, the compensating ball joints in the slider blocks 48 and 50 would not be needed. Therefore, it will be understood that it is not intended to limit the invention to just the embodiment disclosed.

The embodiments of the invention in which an exclusive property or privilege is claimed are defined as follows:

1. For use in a vehicle wiper system having a rotating crank arm and a drive link having an axis, and in which said drive link is potentially subjected to compression and tension loads along its axis in excess of the normal compression and tension loads as said wiper system operates, an improved means for coupling said crank arm and drive link so as to relieve said excessive loads, comprising,
    a toggle member having two ends and pivoted between said ends to said crank arm,
    a beam member comprising a first beam extending in one direction and a second beam extending in the opposite direction relative to said drive link axis, each of said beams further having a free end joined to an end of said toggle member and a fixed end anchored relative to said drive link, so that one beam is put into tension and the other into compression along their length as said drive link experiences excess loads, said beams further having a critical buckling load greater than said normal loads but less than said excess loads,
    whereby, said crank arm drives said drive link through said toggle member and beam member, with one of said beams buckling under excess compression load and the other under excessive tension load, thereby allowing said drive link to effectively yield.

2. For use in a vehicle wiper system having a rotating crank arm and a drive link formed as an elongated stamping with side walls parallel to a drive link axis, and in which said drive link is potentially subjected to compression and tension loads along its axis in excess of the normal compression and tension loads as said wiper system operates, an improved means for coupling said crank arm and drive link so as to relieve said excessive loads, comprising,
    a toggle member having two ends and pivoted between said ends to said crank arm,
    a first beam extending in one direction and stamped integrally from one drive link side wall,
    a second beam extending in the opposite direction and stamped integrally from the other drive link side wall, each of said beams further having a free end aligned with the free end of the other beam and joined to an end of said toggle member, so that one of said beams is put into compression along its length as said drive link experiences said excess loads, said beams further having a critical buckling load greater than said normal loads but less than said excess loads,
    whereby, said crank arm drives said drive link through said toggle member and beam member, with one of said beams buckling under excess compression load and the other under excessive tension load, thereby allowing said drive link to effectively yield.

* * * * *